US00RE48093E

(19) United States
(12) Reissued Patent
Hairston et al.

(10) Patent Number: US RE48,093 E
(45) **Date of Reissued Patent: *Jul. 14, 2020**

(54) BACKPACK FRAME

(71) Applicant: KUIU, LLC, Dixon, CA (US)
(72) Inventors: Jason Hairston, Dixon, CA (US); Zachary D. West, Seattle, WA (US)
(73) Assignee: KUIU, LLC, Dixon, CA (US)

( * ) Notice: This patent is subject to a terminal disclaimer.

(21) Appl. No.: 16/003,603
(22) Filed: Jun. 8, 2018

Related U.S. Patent Documents

Reissue of:
(64) Patent No.: 9,364,072
Issued: Jun. 14, 2016
Appl. No.: 14/282,167
Filed: May 20, 2014

U.S. Applications:
(63) Continuation of application No. 13/183,767, filed on Jul. 15, 2011, now Pat. No. 8,740,028.
(Continued)

(51) Int. Cl.
*A45F 3/08* (2006.01)
*A45F 3/04* (2006.01)
*A45F 3/10* (2006.01)

(52) U.S. Cl.
CPC ..... *A45F 3/08* (2013.01); *A45F 3/04* (2013.01); *A45F 3/047* (2013.01); *A45F 3/10* (2013.01);
(Continued)

(58) Field of Classification Search
CPC ..... A45F 3/10; A45F 3/08; A45F 3/04
(Continued)

(56) References Cited

U.S. PATENT DOCUMENTS 1,448,918 A * 3/1923 Drager ..... A62B 9/04 224/261
3,106,323 A * 10/1963 Davis ..... A62B 9/04 224/262
(Continued)

FOREIGN PATENT DOCUMENTS

WO 0074517 12/2000
WO 0074517 A1 12/2000

OTHER PUBLICATIONS

Mountain Hardware, Inc., "Radical Thinking: A Backpack that Moves With Your Body, Instead of Against It" Internet. Available at http://www.mountainhardwear.com/exodus.aspx. Last accessed Jun. 16, 2010 and believed to be prior art.
(Continued)

*Primary Examiner* — Cary E Wehner
(74) *Attorney, Agent, or Firm* — Dorsey & Whitney LLP

(57) ABSTRACT

A backpack and frame are disclosed. The backpack frame is designed to be at least partially internal and is of unitary construction, most advantageously of a resin-impregnated material, such as resin-impregnated carbon fiber sheets with selective reinforcement by interstitial layers. The frame has a mid-back portion that includes openings for independently positionable shoulder straps and a lower back portion that provides for a rotatable connection to a belt assembly. A pair of curved stay portions is contiguous with the mid-back portion of the frame and curves outwardly as the stay portions extend downwardly. The frame is preferably curved to match the curvature of the human back. The backpack frame is lightweight and by use of composite materials can provide strength as well as selective flexibility to suspend the load of the backpack and decouple it from the movements of the wearer.

26 Claims, 8 Drawing Sheets

Related U.S. Application Data

(60) Provisional application No. 61/365,097, filed on Jul. 16, 2010.

(52) U.S. Cl.
CPC ... *A45F 2003/045* (2013.01); *Y10T 29/49838* (2015.01)

(58) Field of Classification Search
USPC ..... 224/627–637, 261–263, 259
See application file for complete search history.

(56) References Cited

U.S. PATENT DOCUMENTS

| | | | | | |
|---|---|---|---|---|---|
| 3,938,718 | A | | 2/1976 | Madison | |
| 5,449,102 | A | * | 9/1995 | Sason | 224/632 |
| 5,553,759 | A | * | 9/1996 | McMaster | A45F 3/08 224/259 |
| 5,564,612 | A | | 10/1996 | Gregory | |
| 5,665,295 | A | | 9/1997 | Takamoto et al. | |
| 5,762,243 | A | | 6/1998 | McMaster et al. | |
| 5,823,414 | A | | 10/1998 | Gal | |
| 5,890,640 | A | * | 4/1999 | Thompson | 224/630 |
| 5,904,282 | A | * | 5/1999 | Gleason | 224/635 |
| 5,954,250 | A | | 9/1999 | Hall et al. | |
| 5,954,253 | A | * | 9/1999 | Swetish | 224/631 |
| 5,984,157 | A | | 11/1999 | Swetish | |
| 6,892,915 | B2 | | 5/2005 | Mares | |
| 7,028,873 | B1 | * | 4/2006 | Collier | A45F 3/08 224/628 |
| 7,287,677 | B2 | * | 10/2007 | Reid | 224/637 |
| 7,329,457 | B2 | * | 2/2008 | Renard et al. | 428/297.4 |
| 7,644,847 | B2 | | 1/2010 | Howell | |
| 8,240,531 | B2 | * | 8/2012 | Lam | 224/631 |
| 8,608,040 | B2 | | 12/2013 | Cheesman et al. | |
| 8,678,258 | B1 | * | 3/2014 | Knight | A45F 3/08 224/628 |
| 8,740,028 | B2 | * | 6/2014 | Hairston et al. | 224/636 |
| 9,364,072 | B2 | | 6/2016 | Hairston et al. | |
| 2005/0035170 | A1 | | 2/2005 | Sears | |
| 2005/0255311 | A1 | | 11/2005 | Formella | |
| 2006/0163305 | A1 | | 7/2006 | Tong | |
| 2006/0283907 | A1 | | 12/2006 | Green et al. | |
| 2008/0008868 | A1 | | 1/2008 | Atkins et al. | |
| 2009/0015022 | A1 | | 1/2009 | Rome et al. | |
| 2010/0032464 | A1 | | 2/2010 | Gleason, Jr. | |
| 2010/0282252 | A1 | | 11/2010 | Cheesman et al. | |
| 2015/0189974 | A1 | * | 7/2015 | Bercaw | A45F 3/04 224/633 |
| 2017/0208925 | A1 | * | 7/2017 | Neibarger | A45F 3/00 |

OTHER PUBLICATIONS

Supplementary European Search Report for Application No. 11807597.7, issued Oct. 30, 2013.

International Search Report and Written Opinion for PCT/US2011/044256, issued Mar. 28, 2012.

* cited by examiner

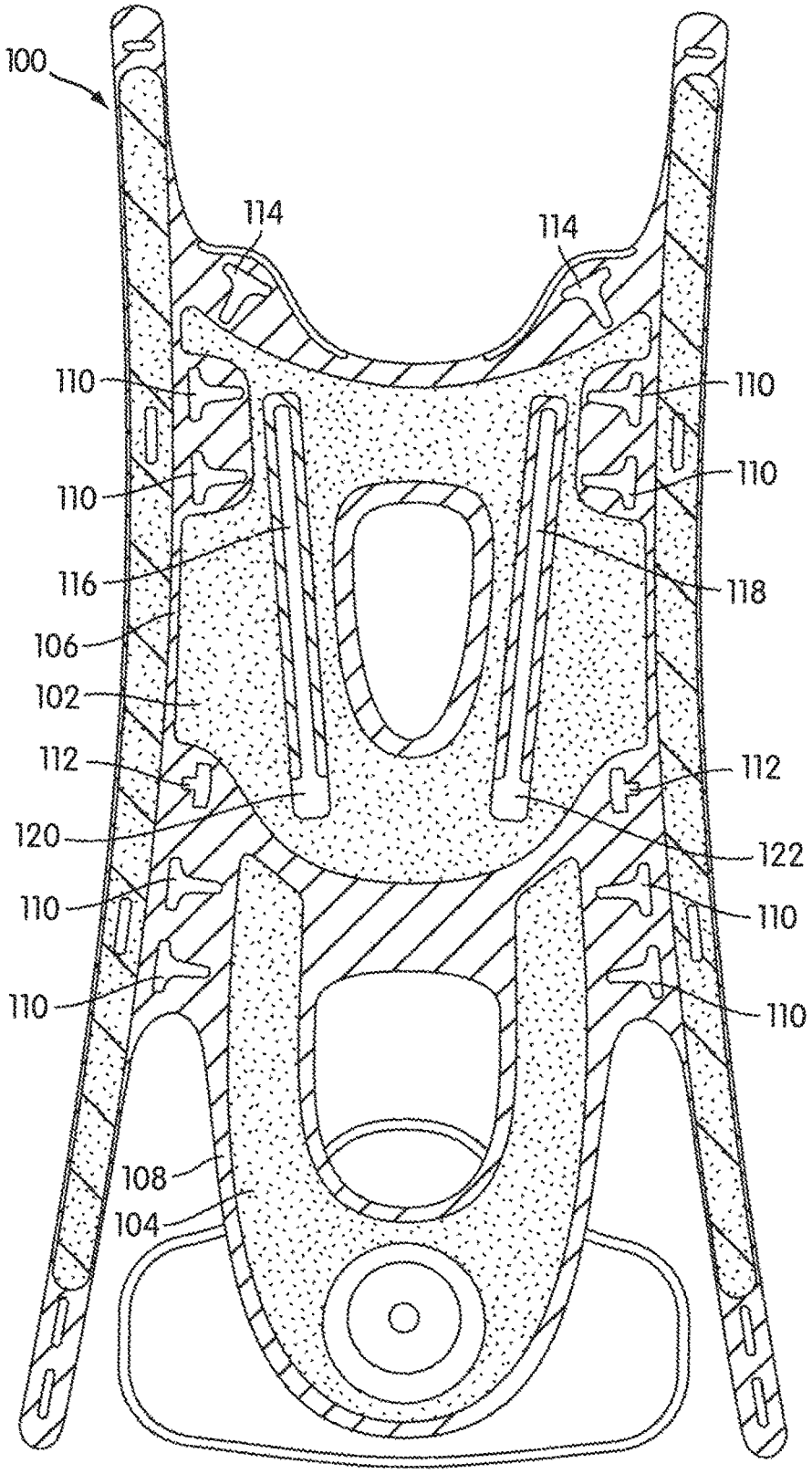
FIG. 8
Amended

BACKPACK FRAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. application Ser. No. 13/183,767, filed Jul. 15, 2011, now U.S. Pat. No. 8,740,028, issued on Jun. 3, 2014, which claims priority to U.S. Provisional Patent Application No. 61/365,097, filed Jul. 16, 2010. The contents of both of those applications are incorporated by reference in their entirety.

BACKGROUND OF THE INVENTION

1. Field of the Invention

The invention relates to frames for backpacks and knapsacks.

2. Description of Related Art

Many backpacks and knapsacks have rigid or semirigid frames that act to suspend the backpack load and distribute it more evenly to the wearer's body. Some frames also allow a user to secure or cinch gear to his or her back more easily than with a backpack alone. Backpack frames may be either internal to the backpack or external to it.

Traditionally, external backpack frames have been made of metal tubes, such as aluminum or steel tubes. These types of frames are simple to construct, as the tubes are simply welded together, but they are typically very heavy, and thus reduce the effective load that a user can carry.

Internal backpack frames are generally made to be lighter, but problems typically arise in making an internal frame that has a useful combination of strength and flexibility. Some degree of flexibility in a backpack frame can help to cushion the user against shifts in the load as he or she walks or runs and to "decouple" the backpack load from the user and his or her movements. However, the problem is multifaceted, because there are some places in a backpack frame where strength and stiffness are warranted in order to properly support the backpack load.

One solution to the stiffness/flexibility problem is to use different materials for different parts of the backpack frame, and some manufacturers have attempted to do so. However, conventional attempts to use many different materials in the same frame often become so complex that they are difficult to manufacture and maintain.

SUMMARY OF THE INVENTION

One aspect of the invention relates to a backpack with a semi-internal frame. The backpack frame is of unitary construction and includes a mid-back portion with openings that allow independently positionable shoulder strap assemblies to be attached. A U-shaped lower back portion provides a connection point for a belt assembly. A pair of stay portions are adapted to rest within a backpack, support a backpack load, and dynamically store and release energy resiliently so as to decouple the load from the wearer. The stay portions begin parallel to one another at a point just above the mid-back portion and curve outward laterally as they extend downward. The backpack frame may have a general curvature to match that of the human back, and may be comprised of resin-impregnated materials, including selectively reinforced carbon fiber.

Another aspect of the invention relates to a backpack frame, having the features described above.

A further aspect of the invention relates to methods of forming a backpack frame. In general, these methods comprise layering sheets of material cut to define the shape of the backpack frame, placing interstitial layers of reinforcing material selectively between the sheets of material so as to selectively reinforce parts of the structure, and impregnating the composite structure with a resin material.

These and other aspects, features, and advantages of the invention will be set forth in the description that follows.

BRIEF DESCRIPTION OF THE DRAWING FIGURES

The invention will be described with respect to the following drawing figures, in which like numerals represent like views throughout the drawings, and in which:

FIG. 8 is a rear elevational view of a backpack frame according to another embodiment of the invention, shaded to indicate the position and extent of reinforcing layers within the frame.

DETAILED DESCRIPTION

Figure 1:
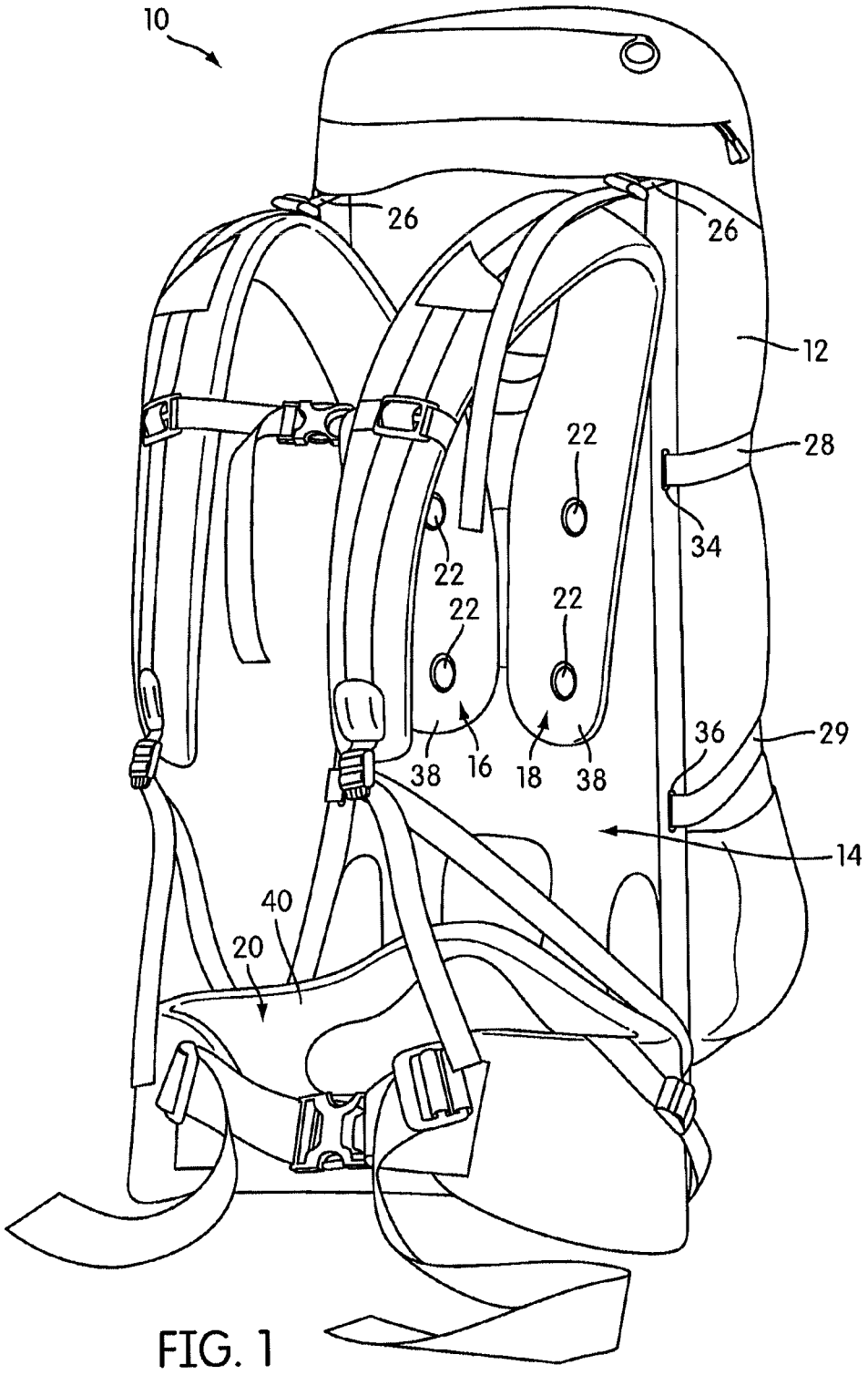
FIG. 1 is a perspective view of a backpack and frame according to one embodiment of the invention.

FIG. 1 is a rear perspective view of a backpack, generally indicated at 10, according to one embodiment of the invention. The backpack has a closeable storage volume 12 and a semi-internal frame, generally indicated at 14. As used in this description, the term "semi-internal" refers to the fact that in the illustrated embodiment, the frame 14 is at least partially exposed. However, the frame 14 need not necessarily be partially exposed in all embodiments, and may be completely internal.

The backpack 10 also includes three main load transfer points or nodes, at which the load of the backpack 10 is transferred to the wearer of the backpack 10: two independently adjustable and positionable shoulder strap assemblies 16, 18 and a belt assembly 20. The shoulder strap assemblies 16, 18 [and belt assembly 20] attach to the frame 14 using fasteners 22[, 24]. As will be described below in more detail, the shoulder strap assemblies 16, 18 attach to the frame 14 along respective sliding tracks, so that their vertical and horizontal positions can be independently adjusted. [The] *A* fastener [24] (not shown in FIG. 1) and related structure that secure the belt assembly 20 to the frame 14 are such that the belt assembly 20 can rotate in plane about the axis defined by the fastener [24].

Figure 2:
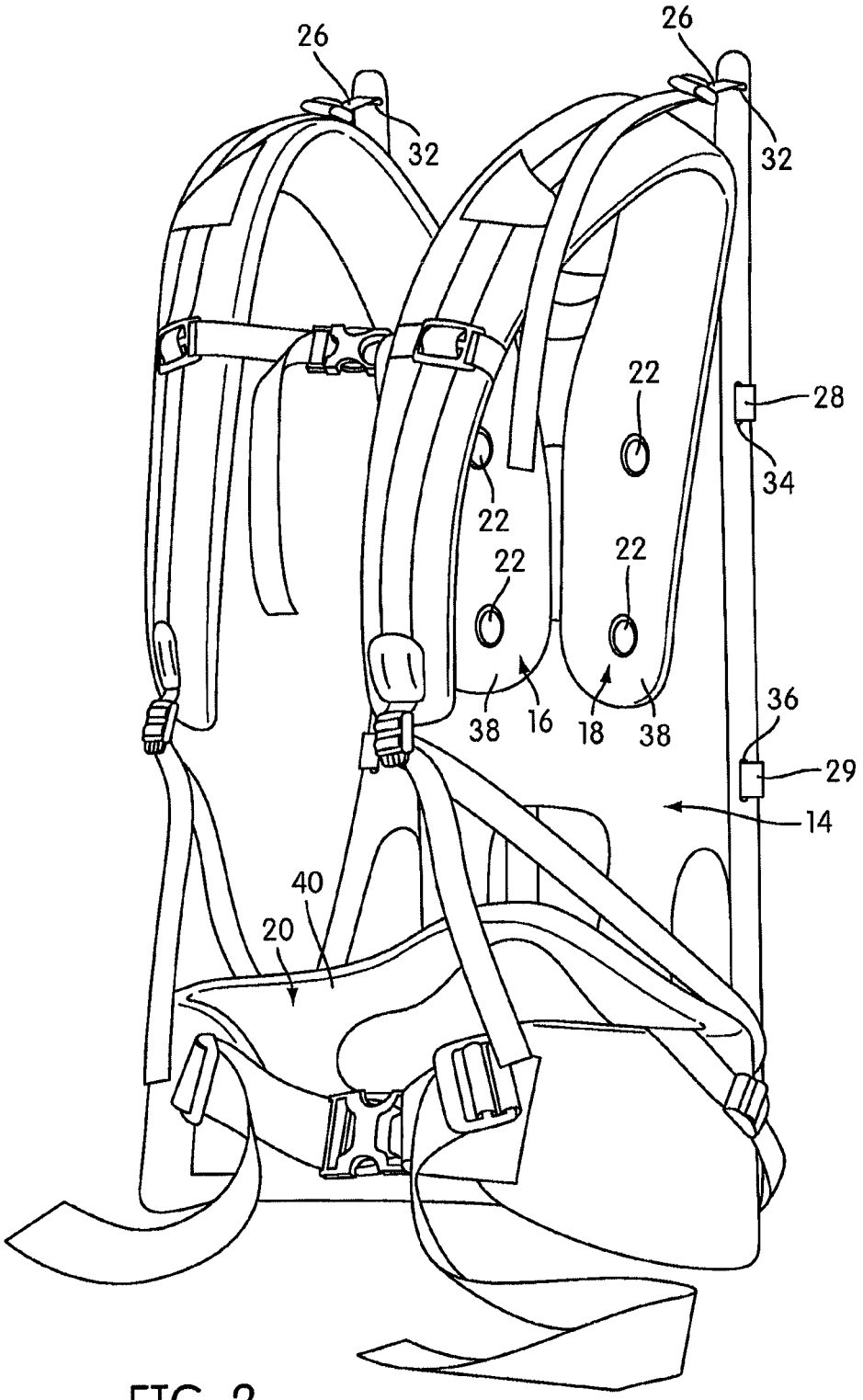
FIG. 2 is a perspective view of the backpack frame of FIG. 1 with straps and without the backpack.

FIG. 2 is a perspective view of the frame 14 with the shoulder strap assemblies 16, 18 and belt assembly 20 installed, but without the backpack 10. Straps 26, 28, 29 attached to the shoulder strap and belt assemblies 16, 18, 20 are looped through slots 32, 34, 36 in the frame 14 to connect the assemblies 16, 18, 20 to the frame 14, as will be described below in more detail. Each of the assemblies 16, 18, 20 includes a padded portion 38, 40 that is adapted to rest against the body. Straps 26, 28, typically made of webbing, such as nylon webbing, are attached to the padded portion. Length adjustment buckles and quick-release connectors are provided to fit the assemblies 16, 18, 20 to the body.

Figure 3:
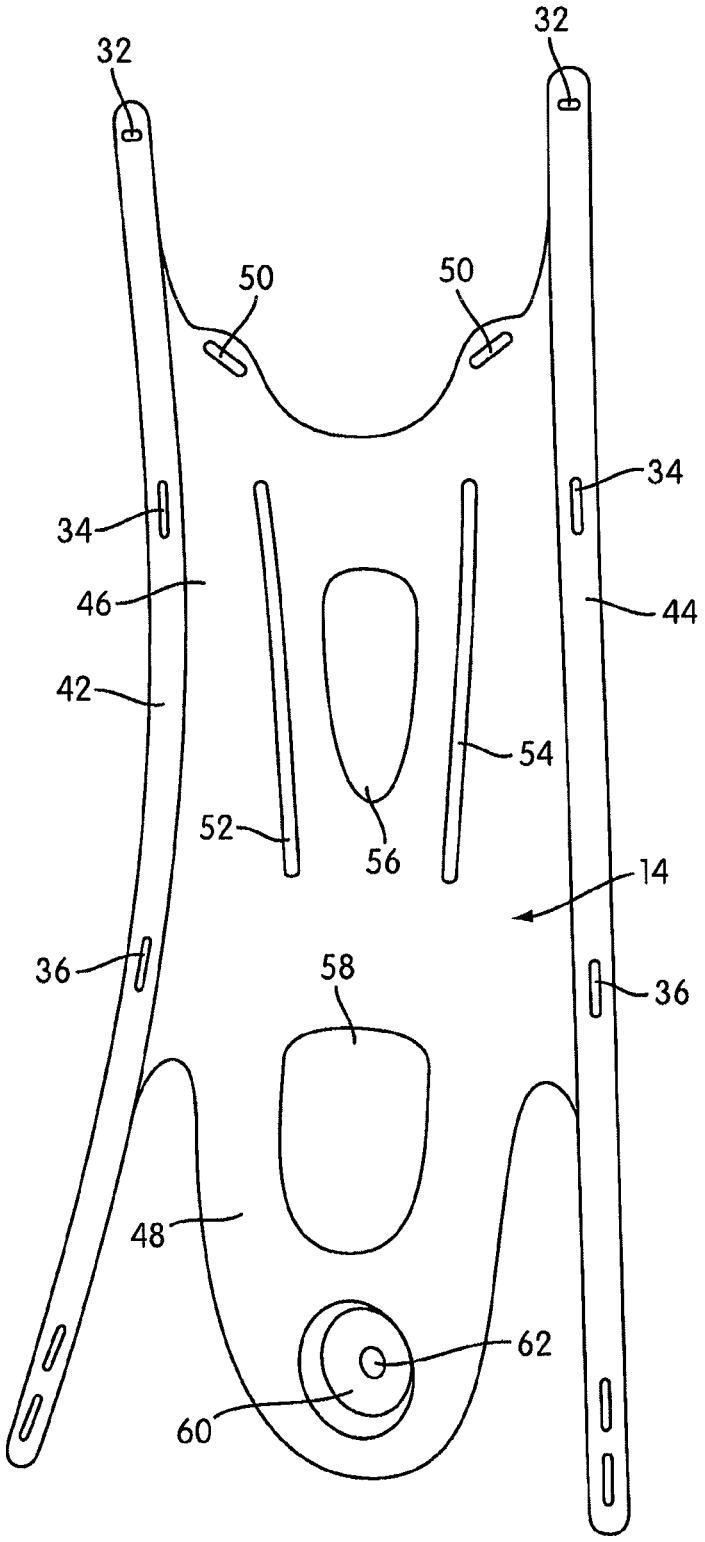
FIG. 3 is a front perspective view of the backpack frame of FIGS. 1-2 in isolation.

FIG. 3 is a front perspective view of the frame 14 in isolation. The frame 14 is most advantageously a unitary (i.e., single piece) structure that is engineered for flexibility in some places and stiffness in others. The frame 14 includes a pair of left and right stay portions 42, 44, a mid-back portion 46, and a lower portion 48, which attaches to the belt assembly 20. (In this context, the terms "left" and "right" refer only to the coordinate system of the figures.)

The left and right stay portions 42, 44 are mirror images of one another, and are the primary means by which the frame 14 connects to and suspends the load of the backpack 10. The respective top and bottom ends of the stay portions 42, 44 fit into correspondingly positioned and sized pockets in the backpack 10 (not shown in the figures). The stay portions 42, 44 provide the combination of flexibility and selective strength that suspends the load in the backpack 10 while mechanically decoupling and cushioning it from the wearer.

In general, the contours of the stay portions 42, 44 are designed to bring the load from the load transfer points, follow generally the curvature of the human back, and provide clearance where necessary so that, for example, an elbow projected rearwardly during stride will not hit the frame 14. Additionally, the static contours of the stay portions 42, 44 help to pretension the stay portions 42, 44 so that in dynamic use, with the backpack 10 loaded, they can store and release energy, increasing their ability to cushion and decouple the load from the wearer. Essentially, the stay portions 42, 44 act as resilient members or springs to suspend the load.

Figure 4:
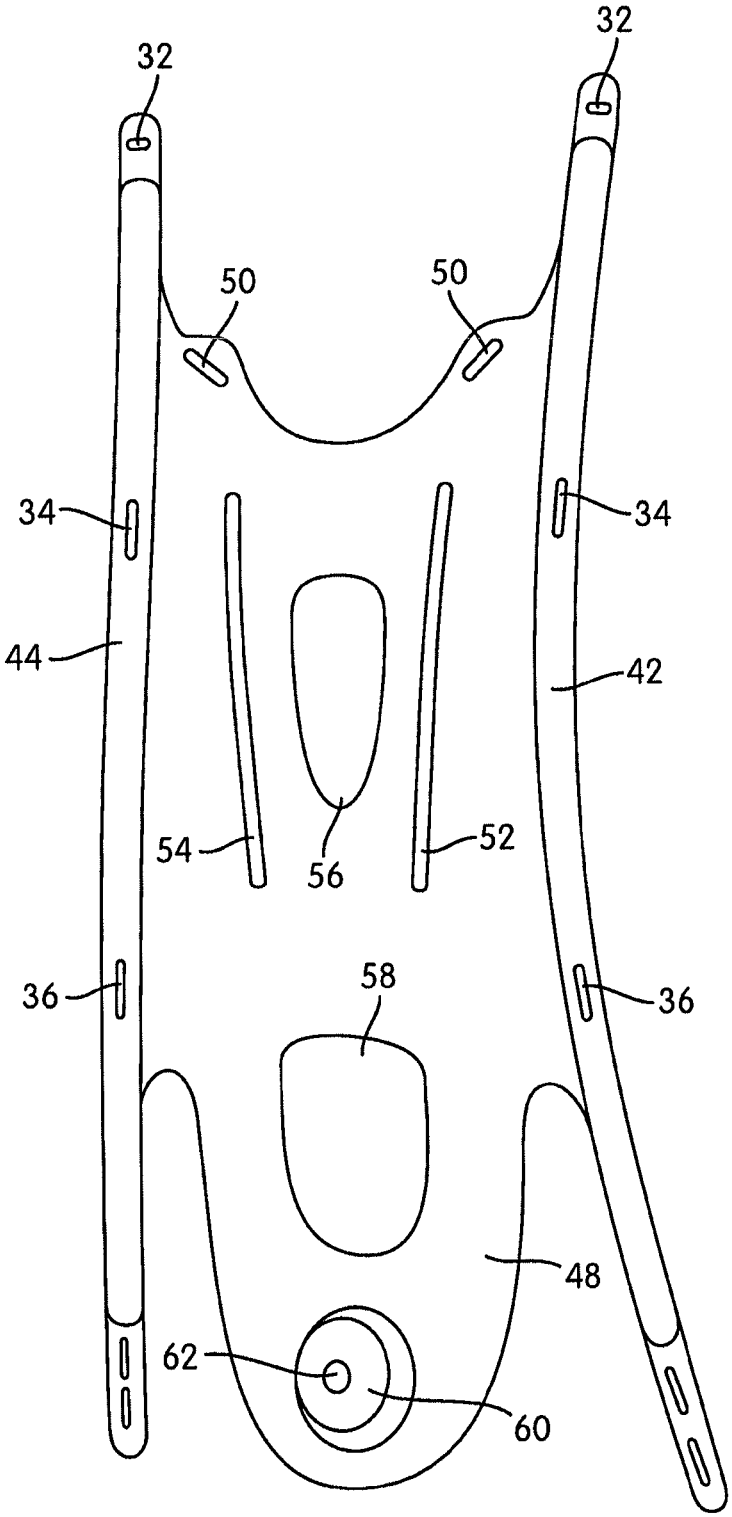
FIG. 4 is a rear perspective view of the backpack frame of FIG. 1.

As can be seen in FIG. 3, as well as in the rear perspective view of FIG. 4, the stay portions 42, 44 curve in at least two planes. Along the long axis of the frame 14, the two stay portions 42, 44 begin generally parallel to one another toward the top of the frame, extending a few inches above the mid-back portion 46. As they sweep downwardly along the long axis of the frame 14, the two stay portions 42, 44 diverge arcuately outwardly until, at their lower terminus, they are separated from the lower portion 48 by a distance and are angled away from the mid-back and lower portions 46, 48 of the frame.

Figure 5:
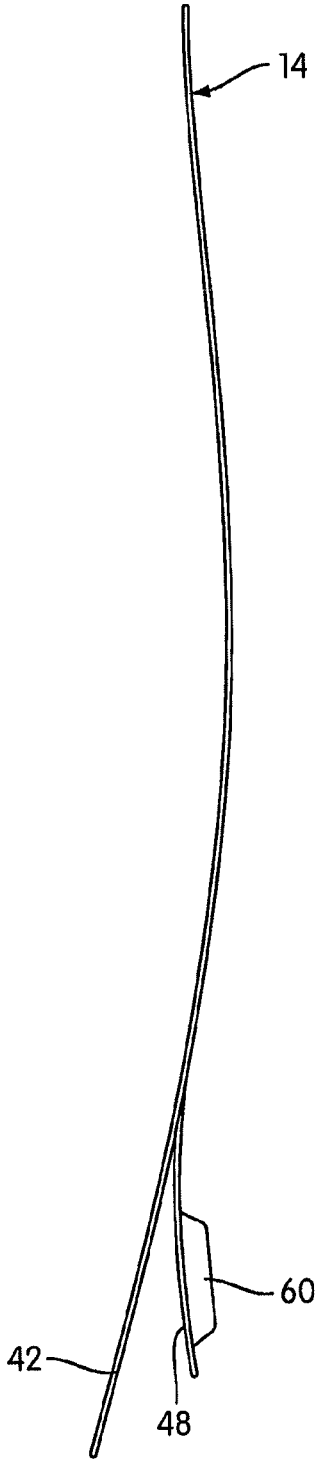
FIG. 5 is a side elevational view of the backpack frame of FIG. 1.
Figure 6:
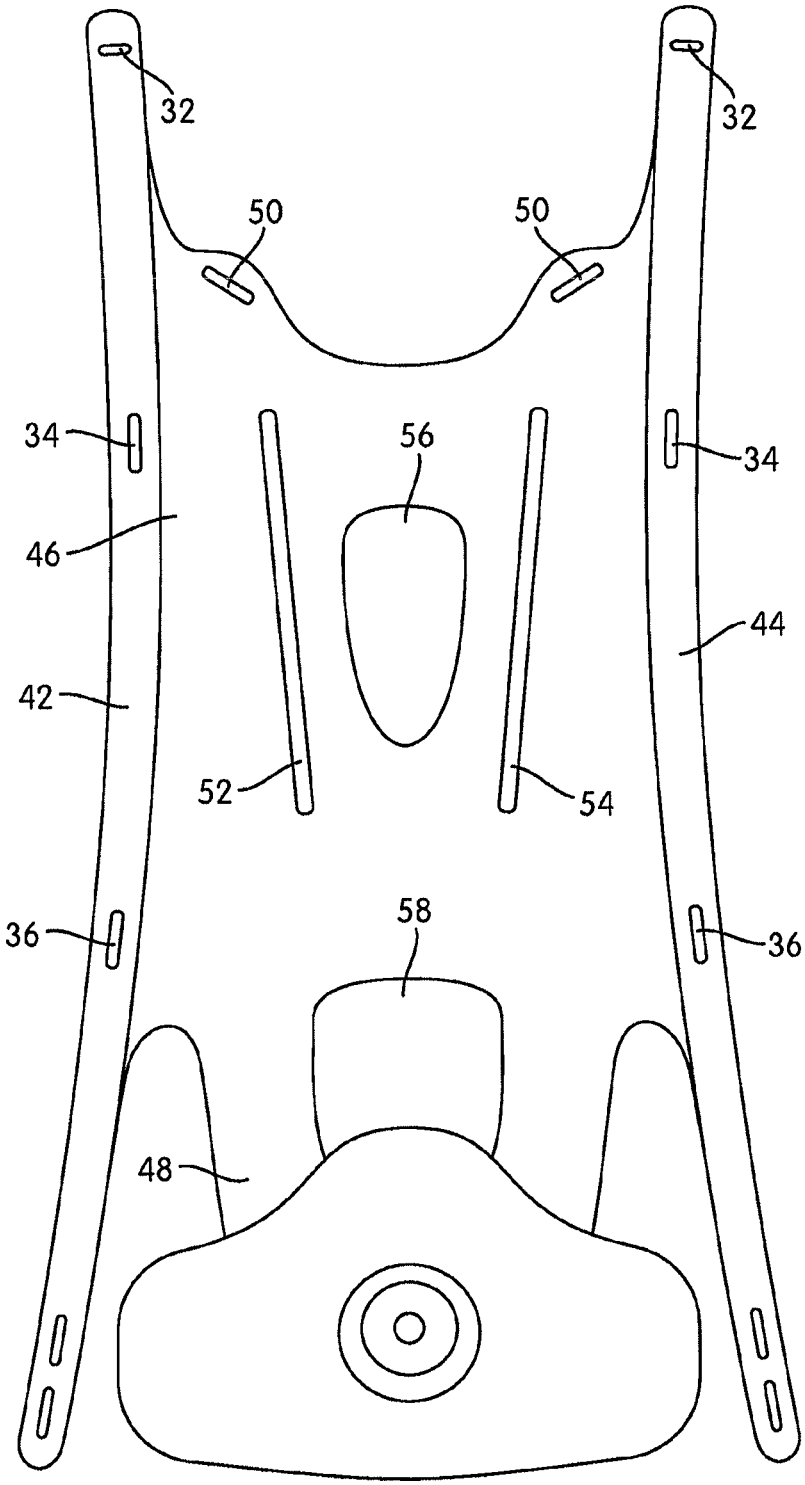
FIG. 6 is a front elevational view of the backpack frame of FIG. 1 with a hip strap attachment installed.

As shown in FIGS. 3 and 4 and in the side elevational view of FIG. 5, as the stay portions 42, 44 extend downwardly and diverge to the left and right of the frame 14, they also curve slightly rearwardly, out of the plane of the frame 14 itself. Because the stay portions 42, 44 will generally be pulled forwardly during use, the slight rearward curvature of the stay portions 42, 44 when unloaded causes them to be pretensioned while in dynamic use. Similarly, since the lower ends of the stay members 42, 44 will typically be drawn laterally inward toward the frame 14, particularly if they are attached to or near the belt assembly 20, the left and right divergent curvature of the stay portions 42, 44 causes them to be pre-tensioned in that plane as they are drawn inward. The top ends of the stay portions 42, 44 also serve to lift the load slightly off the shoulders and to tension the frame 14. As was described above, the respective ends of the stay portions 42, 44 are provided with horizontal and/or vertical slots 32, 34, or any other suitable kind of opening or structure, to facilitate connection and engagement with the backpack 10. The mid-back portion 46 may also be provided with attachment slots 50 along its upper edge.

The mid-back portion 46 of the frame 14 carries a pair of generally linear openings 52, 54 that serve as tracks in which the fasteners 22 can slide, so as to allow the shoulder strap assemblies 16, 18 to be independently positioned. In the illustrated embodiment, the openings that serve as tracks 52, 54 are angled slightly inwardly as they extend from top to bottom, although this need not be the case in all embodiments. Instead, the openings 52, 54 may be given any appropriate shape, including curved or arcuate, so as to provide for a range of shoulder strap assembly 16, 18 positions. Alternatively, instead of a set of continuous track-openings 52, 54, some embodiments of the frame 14 may be provided with sets or series of unconnected, discrete openings that provide discrete positions into which the shoulder strap assemblies 16, 18 may be secured.

The mid-back and lower portions 46, 48 of the frame 14 carry two large openings 56, 58. These openings 56, 58 provide ventilation and air flow, and also serve to lighten the frame 14.

The lower portion 48 of the frame 14 has the general U-shape of a tongue. A projection 60, in the form of a truncated cone, projects forwardly, out of the plane of the frame 14, is provided for attachment of the belt assembly 20, and includes its own opening 62 to facilitate the passage of fasteners and the securement of the belt assembly 20. The space 64 between the lower end of the track-openings 52, 54 and the lower of the two large openings 58 acts as a de facto hinge portion, allowing the lower portion 48 to flex somewhat relative to the mid-back portion. As can be seen in the side elevational view of FIG. 5, the mid-back and lower portions 46, 48 are generally contoured to follow the curvature of the human back.

The frame 14 may be made of a number of materials, including plastics, but is most advantageously made of composite-type, resin-impregnated materials. For example, in the illustrated embodiment, the frame 14 is made primarily of layers of resin-impregnated carbon fiber sheeting, with selective reinforcement by including interstitial materials between adjacent layers of carbon fiber so as to selectively create sandwich-type composites in areas of the frame requiring more strength or flexibility. The layers of carbon fiber may be comprised of, for example, sheets of 284 twill carbon fiber sheeting, and high wear areas, such as the area around the opening 62 in the projection 60 may include additional layers of carbon fiber sheeting. An advantage of such composite materials is that they have the capacity to dynamically store and controllably release more energy as they flex than pure plastics or metals would, which may allow them to cushion and decouple the load from the wearer more effectively than other materials.

Figure 7:
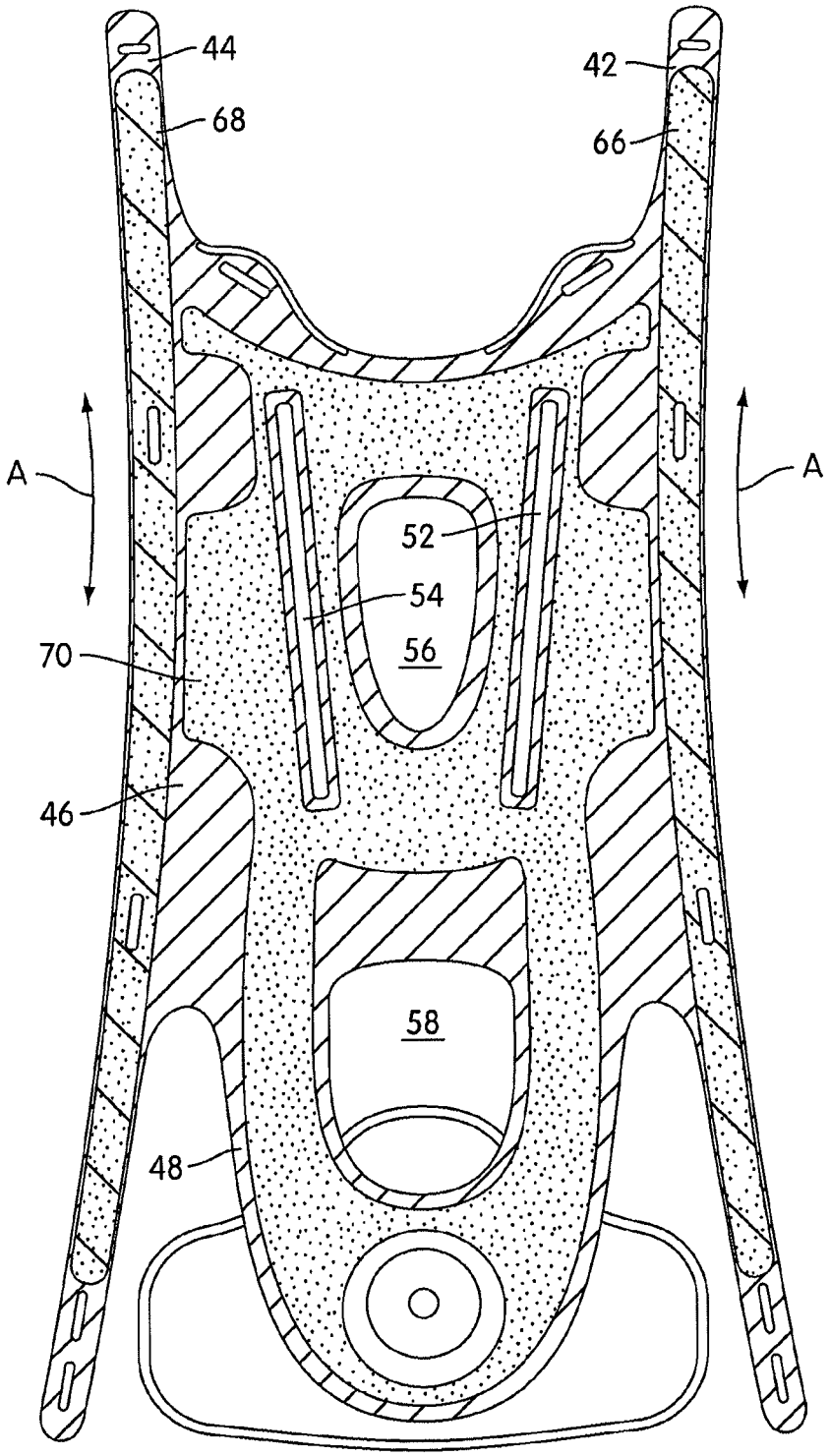
FIG. 7 is a rear elevational view of the backpack frame of FIG. 1 shaded to indicate the position and extent of reinforcing layers within the frame.

FIG. 7 is a rear elevational view of the frame 14 that is shaded to illustrate the location of reinforcements. More specifically, the stippled shading in FIG. 7 illustrates the location and extent of reinforcing material. Typically, in the illustrated embodiment, a reinforced area is reinforced with at least one layer of reinforcing material, such as FIBERGLAS®, between inner and outer layers of primary material.

The stays 42, 44 have reinforcements 66, 68 along substantially the entirety of their length, terminating just before the ends of the stays 42, 44. In some embodiments, the reinforcement may comprise sheets of woven or non-woven glass fiber (such as FIBERGLAS®). However, in the illustrated embodiment, the reinforcements 66, 68 in the stays 42, 44 comprise oriented strands of glass yarn or fiber, laid along the long axis of the stays 42, 44, as indicated by arrows A in FIG. 7. In other embodiments, the reinforcements 66, 68 in the stays 42, 44 may comprise foam, as will be described below in more detail.

In addition to the glass fiber reinforcements 66, 68 in the stays 42, 44, a broad section of the frame 14 that extends from the mid-back portion 46 into the lower-back portion 48 is reinforced by the inclusion of a foam insert 70 between two layers of carbon fiber sheeting, creating a sandwich-type composite material. The foam insert 70 covers the area around the large opening 56 and the two track-openings 52, 54 in the mid-back portion 46 and extends downwardly in a horseshoe-shape into the lower portion 48. The foam may be, for example, a PVC closed cell foam.

The frame 14 may be made by any known method of resin-impregnation. One particularly advantageous manufacturing method is resin extrusion, in which sheets of material are cut to desired shapes, laid in a mold, and resin is pumped into and drawn out of the mold. The resin used in the manufacture of the frame 14 may be any resin known in the art. For example, polyester and epoxy resins may be used in embodiments of the invention, although polyester resins may be more UV-stable over time, and may thus be preferred in some embodiments.

A completed frame 14 may be, for example, on the order of 0.375 inches thick to about 0.625 inches thick, depending on the desired stiffness and the loads that are to be carried. The frame 14 may vary somewhat in thickness across its area, with reinforced areas being thicker. The frame 14 as a whole may be thicker if greater strength and/or stiffness are required.

The size and proportions of the frame 14 will generally be dictated by anthropometric data and ergonomic considerations. Backpacks 10 and their frames 14 may be made in a variety of sizes, based on the same or different proportions.

Frames according to embodiments of the invention may also include additional features. For example, in some embodiments, a frame may include portions that extend perpendicularly outward from the mid-back or lower back portions and can be used to cinch gear to the frame.

FIG. 8 is a rear elevational view of a frame 100 according to another aspect of the invention, shaded similarly to FIG. 7 to illustrate the locations of reinforcements. Frame 100 is substantially similar to frame 14, and thus, the description above will suffice for most elements. Frame 100 differs from frame 14 of FIGS. 1-7 in the location and extent of its reinforcements and in the size and shape of certain openings.

Specifically, frame 100 has separate reinforcements 102, 104 in the mid-back and lower portions 106, 108. The reinforcements 102, 104 may be of the same material or different materials, and may be the same material as used in frame 14 of FIGS. 1-7. Additionally, there are a number of T-shaped openings 110, 112, 114 which may be used to secure straps or other fittings to the frame 100. The tracks 116, 118 are also slightly different in shape, as they have lower ends 120, 122 that broaden into generally rectangular openings. Thus, as frame 100 illustrates, frames according to embodiments of the invention may have many different types, shapes, and sizes of openings.

While the invention has been described with respect to certain embodiments, the description is intended to be illuminating, rather than limiting. Modifications and changes may be made within the scope of the invention, which is defined by the appended claims.

What is claimed is:

1. A backpack frame, comprising:

a unitary, contiguous, contoured frame body, including a mid-back portion having first and second elongate openings, the first and second elongate openings being constructed and arranged to receive shoulder strap assemblies such that each of the shoulder strap assemblies is independently positionable within one of the first and second openings;

a lower portion contiguous with the mid-back portion, the lower portion including a U-shaped tongue structure constructed and adapted to receive a belt assembly; and a pair of elongate stay portions that are contiguous with the mid-back portion, the pair [if] *of* elongate stay portions being generally parallel to one another where the pair of elongate stay portions are connected to the mid-back portion, the pair of elongate stay portions extending away from the mid-back portion by curving laterally outward relative to the mid-back portion.

2. The backpack frame of claim 1, wherein the backpack frame comprises a resin-impregnated unitary structure.

3. The backpack frame of claim 2, wherein the resin-impregnated structure comprises at least two layers of carbon fiber sheeting.

4. The backpack frame of claim 3, wherein the resin-impregnated structure further comprises selectively placed interstitial reinforcing layers between the at least two layers of carbon fiber sheeting.

5. The backpack frame of claim 4, wherein the stay portions comprise interstitial reinforcing layers comprised of glass fiber oriented along their respective lengths.

6. The backpack frame of claim 4, wherein the mid-back portion and the lower back portion comprise foam interstitial reinforcing layers.

7. The backpack frame of claim 1, wherein the mid-back and lower back portions are contoured to match the contours of the human back.

8. The backpack frame of claim 1, wherein the first and second openings comprise generally linear tracks.

9. A backpack and frame combination, comprising:

a backpack including one or more panels enclosing a storage volume, the backpack having frame-receiving structure, a pair of shoulder strap assemblies, and a belt assembly; and a unitary, contiguous backpack frame including a mid-back portion having first and second elongate openings, the first and second elongate openings being constructed and arranged to receive shoulder strap assemblies such that each of the shoulder strap assemblies is independently positionable within one of the first and second openings, a lower portion contiguous with the mid-back portion, the lower portion including a U-shaped tongue structure constructed and adapted to receive the belt assembly, and a pair of elongate stay portions that are contiguous with the mid-back portion, the pair of elongate stay portions being generally parallel to one another where the pair of elongate stay portions are connected to the mid-back portion, the pair of elongate stay portions extending away from the mid-back portion by curving laterally outward relative to the mid-back portion;

wherein the backpack frame is arranged in the backpack such that it is received in the frame-receiving structure.

10. The backpack and frame combination of claim 9, wherein the backpack frame comprises a resin-impregnated unitary structure.

11. The backpack and frame combination of claim 10, wherein the resin-impregnated structure comprises at least two layers of carbon fiber sheeting.

12. The backpack and frame combination of claim 11, wherein the resin-impregnated structure further comprises selectively placed interstitial reinforcing layers between the at least two layers of carbon fiber sheeting.

13. The backpack and frame combination of claim 12, wherein the stay portions comprise interstitial reinforcing layers comprised of glass fiber oriented along their respective lengths.

14. The backpack and frame combination of claim 12, wherein the mid-back portion and the lower back portion comprise foam interstitial reinforcing layers.

15. The backpack and frame combination of claim 9, wherein the mid-back and lower back portions are contoured to match the contours of the human back.

16. The backpack and frame combination of claim 9, wherein the lower, separate free ends of the pair of stay portions are drawn forwardly in a loaded configuration of the backpack frame.

*17. A pack frame, comprising:*

*a unitary, contiguous frame body including:*

*a mid-back portion comprising a plurality of openings, the plurality of openings being configured to connect to shoulder straps, the mid-back portion having a mid-back maximum width;*

*a lower portion extending downward from the mid-back portion, the lower portion having a central opening, the lower portion hinging relative to the mid-back portion at the central opening, the lower portion having a maximum lateral width, the maximum lateral width being less than the mid-back maximum width of the mid-back portion, the lower portion including a u-shaped structure;*

*a pair of elongate stay portions, each elongate stay portion including a top end extending upward from the mid-back portion and positioned laterally outward from the mid-back portion;*

*a belt coupled to the u-shaped structure, the belt having straps, the straps overlapping vertical side edges of the u-shaped structure.*

*18. The pack frame of claim 17, wherein the frame body is configured to flex between the plurality of openings of the mid-back portion and the central opening of the lower portion.*

*19. The pack frame of claim 17, wherein the central opening comprises a first edge adjoining the mid-back portion and a second edge adjoining the lower portion.*

*20. A pack frame, comprising:*

*a unitary, contiguous frame body including:*

*a mid-back portion comprising a plurality of openings configured to connect to shoulder straps, the mid-back portion having first and second generally vertical sides and a first width extending from the first generally vertical side to the second generally vertical side;*

*a lower portion extending downward from the mid-back portion and attachable to a belt at a belt-wearing level on a wearer, the lower portion forming a u-shaped tongue, the u-shaped tongue having first and second generally vertical sides separated by a second width, the second width being less than the first width; and*

*a pair of elongate stay portions, each elongate stay portion including a top end extending upward from the mid-back portion and positioned laterally outward from the mid-back portion.*

*21. The pack frame of claim 20, wherein a central back opening is positioned on the frame body, wherein a first portion of the central back opening is positioned between the first and second generally vertical sides of the mid-back portion and a second portion of the central back opening is positioned between the first and second generally vertical sides of the u-shaped tongue.*

*22. The pack frame of claim 20, wherein the frame body is flexible where the mid-back portion and the lower portion intersect.*

*23. A backpack frame, comprising:*

*a unitary, contiguous frame body comprising:*

*a mid-back portion having a plurality of elongate openings, the elongate openings being arranged to receive a shoulder strap assembly, the shoulder strap assembly being independently positionable at a plurality of positions along the plurality of elongate openings,*

*a lower portion extending downward from the mid-back portion, the lower portion defining a u-shaped structure configured to be coupled to a belt; and*

*a pair of elongate stay portions, each elongate stay portion including a top end extending upward from the mid-back portion and positioned laterally outward from the mid-back portion.*

*24. The backpack frame of claim 23, wherein each of the elongate stay portions comprises at least one opening therethrough.*

*25. The backpack frame of claim 23, wherein each of the elongate stay portions comprises parallel lateral side edges.*

*26. The backpack frame of claim 23, wherein the mid-back portion comprises a convex curvature and the pair of elongate stay portions comprise a concave curvature.*

* * * * *